No. 809,809. PATENTED JAN. 9, 1906.
L. A. B. JOHNSON.
PLUNGER LUBRICATOR.
APPLICATION FILED MAR. 29, 1905.

3 SHEETS—SHEET 1.

Witnesses:
Titus M Crow
Augustus B. Coppes

Inventor:
Louis A.B. Johnson.
by his Attorneys.
Howson & Howson

No. 809,809. PATENTED JAN. 9, 1906.
L. A. B. JOHNSON.
PLUNGER LUBRICATOR.
APPLICATION FILED MAR. 29, 1905.

3 SHEETS—SHEET 2.

Inventor
Louis A. B. Johnson
by his Attorneys
Howson & Howson

UNITED STATES PATENT OFFICE.

LOUIS A. B. JOHNSON, OF PHILADELPHIA, PENNSYLVANIA.

PLUNGER-LUBRICATOR.

No. 809,809.     Specification of Letters Patent.     Patented Jan. 9, 1906.

Application filed March 29, 1905. Serial No. 252,696.

*To all whom it may concern:*

Be it known that I, LOUIS A. B. JOHNSON, a citizen of the United States, residing in Philadelphia, Pennsylvania, have invented certain Improvements in Plunger-Lubricators, of which the following is a specification.

My invention consists in a novel structure and mechanism whereby a lubricant is automatically applied to vertically-operating plungers or piston-rods, particularly of the type commonly used in hydraulic elevators.

One object of the invention is to provide a device of the character noted which shall automatically deliver definite quantities of oil to the surface of a vertically-operating plunger in such manner that said lubricant is evenly discharged upon its surface.

It is further desired to provide an automatic lubricating device which may be so constructed as to permit the flow of the lubricant from the reservoir to the plunger or rod to be lubricated at definite times—as, for example, while said rod is being moved either upwardly or downwardly.

These objects I attain as hereinafter set forth, reference being had to the accompanying drawings, in which—

Figure 1:
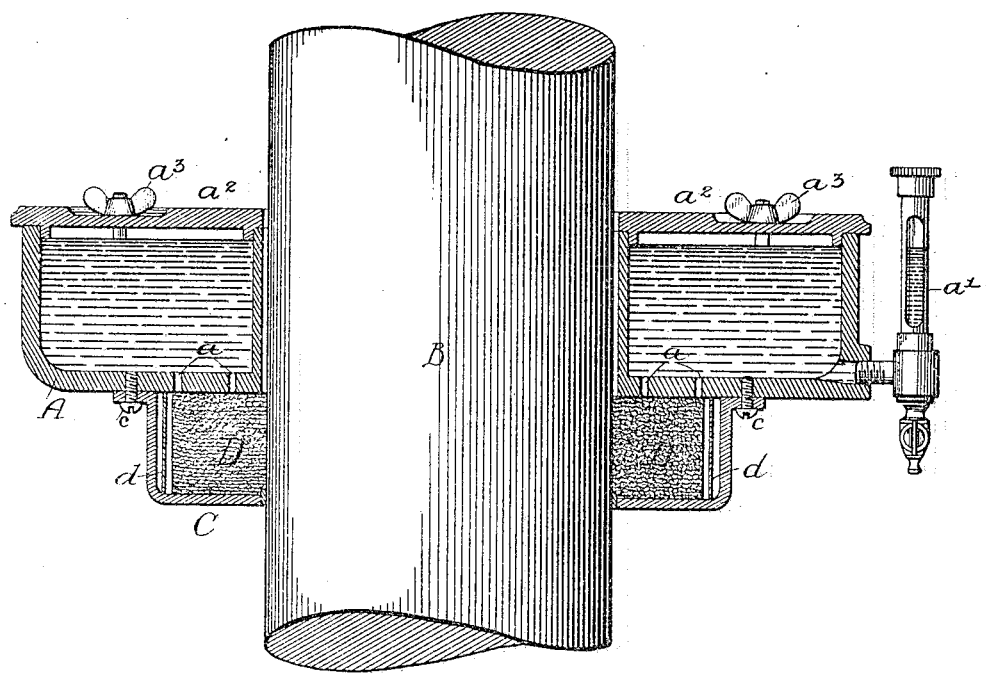
Figure 2:
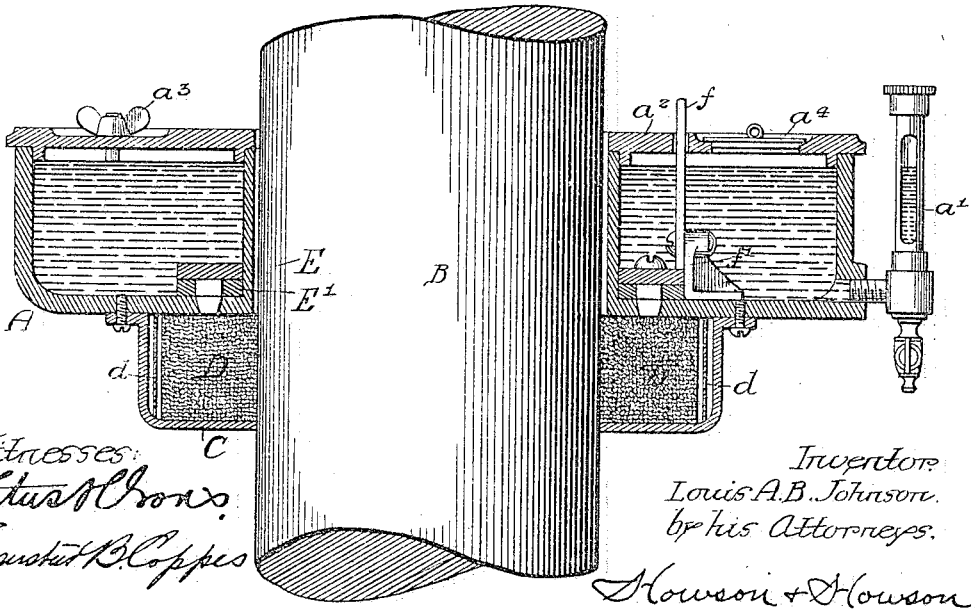
Figure 5:
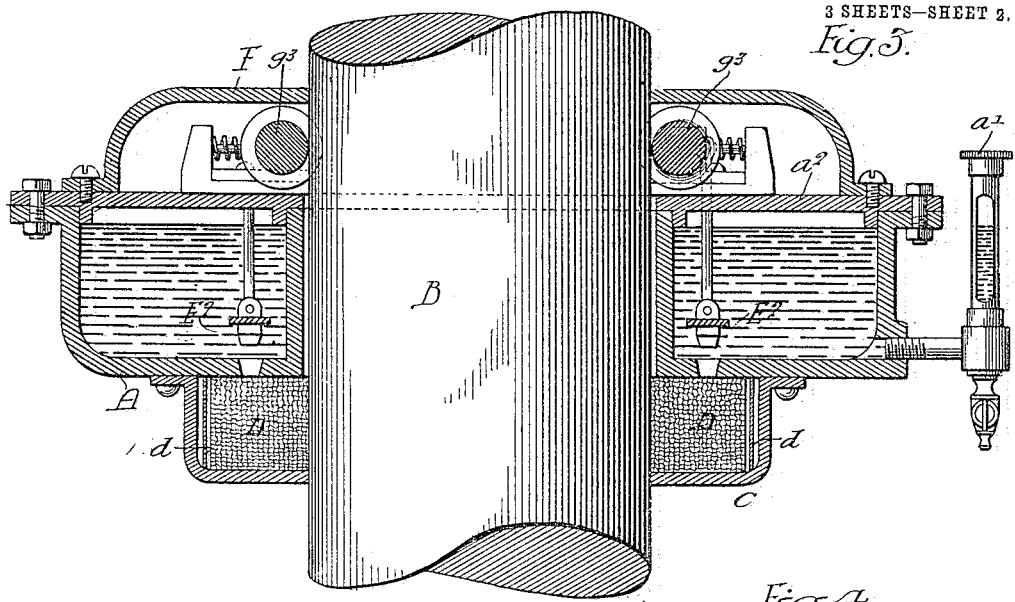
Figure 4:
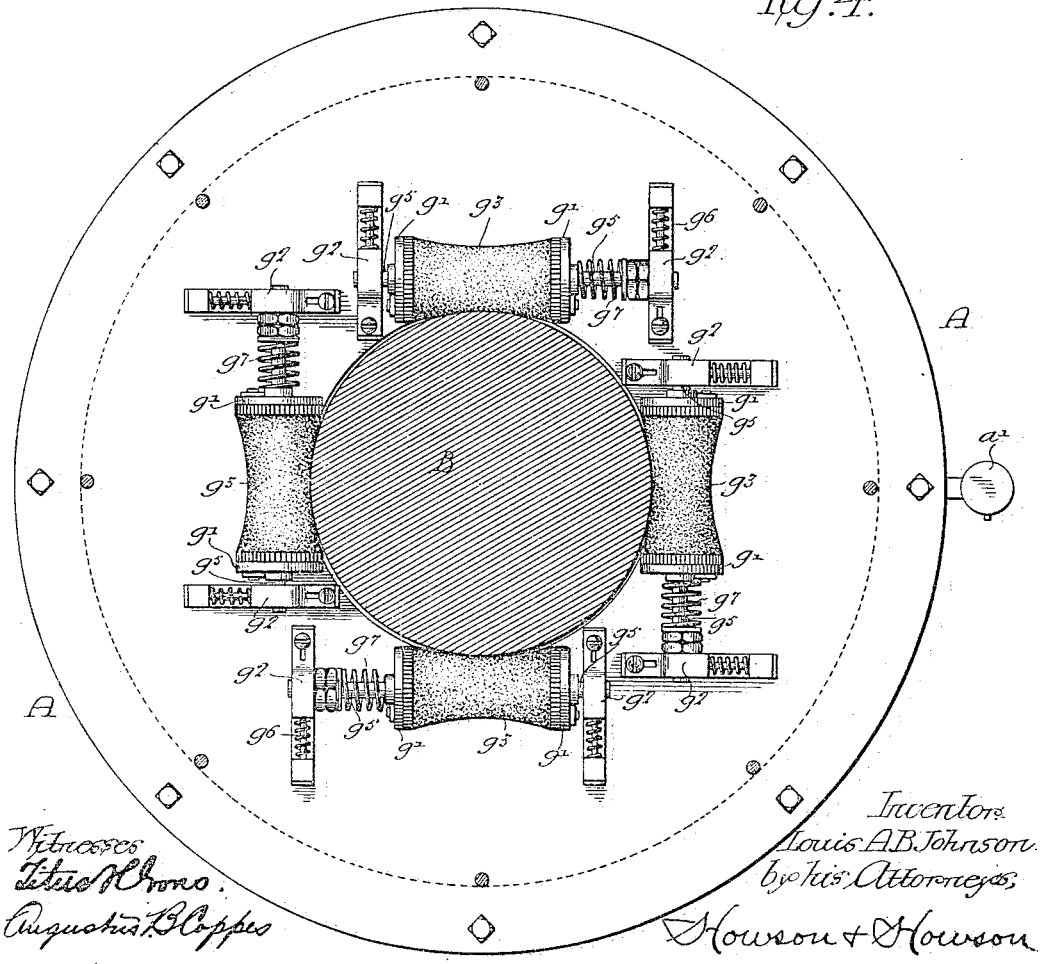
Figure 8:
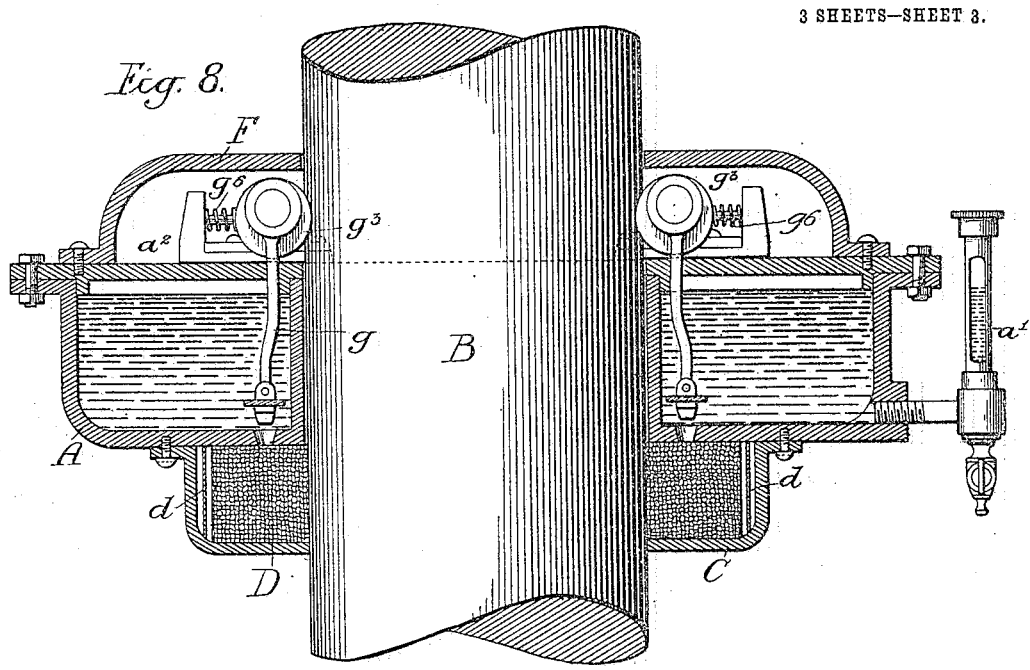
Figure 5:
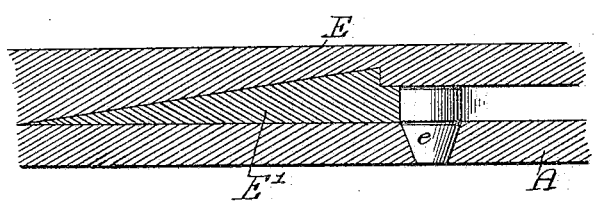
Figure 6:
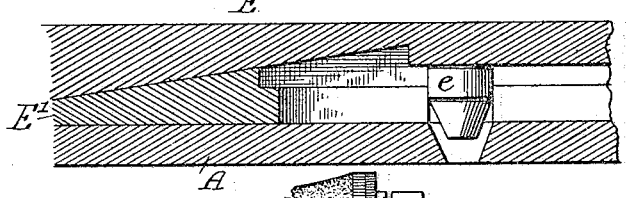
Figure 7:
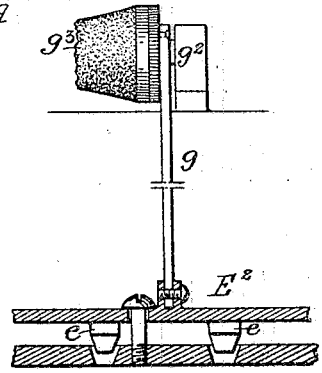

Figure 1 is a sectional elevation of one form of my invention, showing it as applied to a vertical plunger or piston-rod. Fig. 2 is a sectional elevation of a form of my invention in which I provide a hand-operated valve or valves for controlling the flow of lubricant to the plunger. Fig. 3 is a sectional elevation of a form of my device designed to automatically operate a valve or series of valves to permit lubricant to flow to the plunger under definite conditions of movement of said rod. Fig. 4 is a plain view, partly in section, of that form of my invention shown in Fig. 3. Figs. 5 and 6 are enlarged fragmentary sectional elevations illustrating two positions of the valve mechanism employed in that form of my invention shown in Fig. 2. Fig. 7 is a sectional elevation illustrating the detail construction of a portion of the valve mechanism employed with that form of my invention shown in Figs. 3 and 4, and Fig. 8 is another form of my invention for automatically delivering lubricant to the plunger.

In the above drawings, A represents a reservoir for lubricant, surrounding the plunger or piston-rod B and having below it an extension C, forming a secondary reservoir, also annular in form, but without a wall adjacent to the plunger, so that while the liquid in the main reservoir A is in no way in contact with or directly supplied to the plunger liquid in the secondary reservoir is free to flow into contact with the piston-rod and lubricate the same. The device as a whole usually rests upon or is connected to the upper head of the cylinder, within which operates the piston connected to the rod B.

In order to evenly distribute the lubricant over the surface of the piston-rod, as well as regulate its flow from the secondary reservoir, I fill this latter with suitable packing or waste D and provide an annular corrugated spring $d$ or equivalent device within said reservoir between said body of packing and the wall, whereby the former is continually pressed toward and into contact with the plunger.

In the form of the invention shown in Fig. 1 I provide a series of holes $a$ through the bottom of the main reservoir A, whereby lubricant is free to pass therefrom into the secondary reservoir C at a predetermined rate. While I have shown said secondary reservoir made as a separate casing and held by screws $c$ to the bottom of the main reservoir, it may, if desired, be formed integral therewith. A gage-glass is also preferably connected to the main reservoir in order to indicate the amount of lubricant therein, there being also provided a cover $a^2$, removably held in position on said reservoir by wing-nuts $a^3$, screwed upon studs passing through it and fixed in the bottom of the main reservoir.

In the form of my device shown in Fig. 2 I provide a series of valve-seats in the bottom of the main reservoir A, through which lubricant may be delivered to the secondary reservoir C, and, as shown in Figs. 2, 5, and 6, I provide a ring E within said main reservoir, having a series of plug-valves $e$ connected to it in such manner as to engage the valve-seats to cut off the flow of lubricant therethrough when said ring is in certain positions. Interposed between the ring E and the bottom of the main reservoir I insert a second ring E', free to move relatively to the ring E and provided with a series of beveled faces designed to coact with similarly-beveled faces $e^2$ $e'$ of said first ring. For moving the ring E', I provide a lever $f$, pivotally mounted upon a bracket $f'$, having one end projecting through the cover $a^2$ of the reservoir and its other end connected to the ring E'. It will be seen that movement of the lever $f$ upon its pivot can be made to slide the ring E' around the rod B in such manner that the ring E, with its valves, is bodily raised, with the result that the lubricant is free to flow from the main reservoir through the valve-seats and into the secondary reservoir C. If desired, I may provide a filling-opening through the cover $A^2$ of the main reservoir and close it by a cap $a^4$, as shown in Fig. 2.

In the form of my invention illustrated in Figs. 3, 4, and 7 I provide means whereby the valves between the main and secondary reservoirs are kept closed except during the time the plunger B is moving upwardly relatively to the reservoirs. As in the case shown in Fig. 2, there are a series of valve-seated openings in the bottom of the main reservoir A and valves $e$, carried by a valve-ring $E^2$. This ring, as before, lies within the reservoir A and has connected to it a series of rods $g$, attached to pins on crank-disks $g'$. These crank-disks are loosely carried upon spindles supported in suitable bearings $g^2$, fixed to the cover $a^2$ of the main reservoir, and these spindles also carry rollers $g^3$, in the present instance four, which are designed to engage and be rotated by the plunger B. In order that the rollers may always engage the plunger with sufficient force to be turned thereby, I movably support their spindles $g^5$ relatively to their main bearings and provide springs $g^6$, acting upon said spindles either directly or through a suitable auxiliary bearing to accomplish this end. Upon each spindle I also provide a spring $g^7$, extending between one of the crank-disks $g'$ and a bearing $g^8$, so as to force each pair of disks into frictional engagement with the ends of their respective rollers $g^3$. As will be seen from Fig. 7, the valve-carrying ring $E^2$ is prevented from being moved upwardly by the rods $g'$ beyond a predetermined amount by means of a screw $e^4$, which is fixed in the bottom of the reservoir A and extends loosely through said valve-ring. Under operating conditions the rods $g$ are so proportioned and their points of attachment to their respective crank-disks are so fixed that when the plunger B moves upwardly the rollers $g^3$ are rotated, thereby also turning the crank-disks $g'$. As a result of this the rods $g$ are moved upwardly and caused to lift the valve-ring $E^2$, so that all of the valves are opened and lubricant is permitted to pass from the main reservoir A into the auxiliary reservoir and so to the plunger. Continued rotation of the rollers $g^3$, caused by the upward movement of the plunger B, has no effect upon the crank-disks and their attached parts other than to maintain them in the open position, since after said disks have been rotated sufficiently to raise the valve-ring through the distance permitted by the screws $e^4$ the rollers merely move in engagement with said disks without further rotating them. As soon as the direction of movement of the plunger B is reversed the disks, being frictionally pressed against their respective rollers by the springs $g^5$, are immediately rotated in a direction the reverse of that previously noted by the rollers $g^2$, which, as before, are turned by said plunger. Such turning of the disks immediately permits the valve-ring $E^2$, with its attached valves, to descend, and the various parts may be so proportioned that the valves are brought to their closed position and the rollers then permitted to turn independently of the disks, or, if desired, the valves after being brought to their seated position may be again raised and held in an open position as long as movement of the plunger continues.

In Fig. 8 I have shown a form of my device in which eccentrics $g^9$ are fixed to the spindles of the rollers $g^3$, and these eccentrics have straps $g^{10}$, to which are connected rods $g$, as in the form of my device shown in Fig. 3, there being also a valve-ring $E^2$ and valves, all carried by said rods. Under operating conditions the rollers $g^3$ are, as before, pressed against the plunger B by springs $g^7$ and as they are turned by vertical movement of said plunger cause alternate up-and-down movement of the valve-ring $E^2$ and of the valves carried thereby, so that lubricant is alternately admitted and cut off from the lower or secondary reservoir C. In this form of the invention, as well as in that shown in Fig. 3, I provide a cap or cover F, extending around the plunger-rod B and over the rollers and their attached mechanism, it being held in position by screws.

It will be seen that with any of the forms of the device shown lubricant is admitted into a secondary reservoir from a main reservoir and from thence passes directly to the plunger-rod to be lubricated, with the result that said lubricant is evenly spread over the entire surface of said rod and that automatically. It will further be noted that the flow of lubricant from the main reservoir may be regulated by the size of the openings in its bottom, as shown in Fig. 1, by hand, as shown in Fig. 2, or by automatic devices actuated from the structure to be lubricated, as shown in Figs. 3 and 4.

I claim as my invention—

1. The combination with a substantially vertical rod to be lubricated, of an annular container forming a reservoir extending around the same, but constructed to retain lubricant out of direct contact with said rod and a secondary container in communication with and under the first container, said second container alone having an opening onto the surface of the rod substantially as described.

2. The combination with a substantially vertical rod to be lubricated, of an annular container surrounding said rod and opening onto the same, and a reservoir having a plurality of valve-controlled openings in communication with said container, substantially as described.

3. The combination with a substantially vertical rod to be lubricated, of two annular containers extending around said rod, one over the other, the upper container having an opening or openings into the lower container and said lower container opening directly onto the rod, substantially as described.

4. The combination with a substantially vertical rod to be lubricated, of a reservoir for lubricant extending around the rod, an annular container connected to the reservoir by a passage other than along said rod, said container surrounding and opening onto the rod, with a body of packing in the container in engagement with the rod, substantially as described.

5. The combination with a substantially vertical rod to be lubricated, of a reservoir for lubricant, an annular container having a plurality of openings from said reservoir and surrounding and opening onto the rod, with a body of packing in the container, and means extending in the container between its wall and the packing for pressing the latter into engagement with the rod, substantially as described.

6. The combination with a substantially vertical rod to be lubricated, of a reservoir constructed to hold lubricant out of direct contact with said rod, an annular container connected thereto by a passage or passages other than along said rod, said container surrounding and opening onto the rod and having within it a body of packing, with an annular spring extending between said packing and the wall of the container for pressing the packing into engagement with the rod, substantially as described.

7. The combination with a substantially vertical rod to be lubricated, of an annular reservoir, and an annular container surrounding the rod having an opening onto the rod, with a valve or valves for controlling the flow of fluid from the reservoir to said container, substantially as described.

8. The combination with a substantially vertical rod to be lubricated, of an annular reservoir and an annular container both extended around the rod, said container having within it a body of packing in engagement with said rod, with a valve or valves for controlling the flow of fluid from the reservoir to the container, substantially as described.

9. The combination with a substantially vertical rod to be lubricated, of two annular containers extending around said rod and disposed one over the other, one of said containers opening onto the rod and communicating with the other container through openings in the bottom thereof, with a valve or valves for controlling the flow of fluid through said openings, substantially as described.

10. The combination with a substantially vertical rod to be lubricated, of a reservoir, a container so disposed as to deliver lubricant to the rod, there being a passage or passages connecting said reservoir and the container, with a valve or valves for controlling the flow of fluid through said passage or passages, and automatic mechanism actuated by the rod for controlling the operation of said valves, substantially as described.

11. The combination with a substantially vertical rod to be lubricated, of a reservoir, an annular container extending around said rod, a valve or valves for controlling the flow of fluid from the reservoir to said container, and a roller or rollers in engagement with the rod operatively connected to said valve or valves, substantially as described.

12. The combination with a substantially vertical rod to be lubricated, of a reservoir, a container having an opening onto the rod, there being passages between the reservoir and the container, a valve or valves controlling the flow of fluid through said passages, a roller having means pressing it against the rod, and a disk frictionally held in engagement with the roller and operatively connected to the valve or valves, substantially as described.

13. The combination with a substantially vertical rod to be lubricated, of a reservoir, a container opening onto the rod, a series of valves controlling passages between the reservoir and the container, a series of rollers adjacent to the rod, means for pressing the rollers into engagement with the rod, friction-disks for the rollers, and rods connecting said disks with the valves, substantially as described.

14. The combination with a substantially vertical rod to be lubricated, of a reservoir, a container opening onto the rod, and under said reservoir, a valve controlling a passage between the reservoir and the container, a roller operatively engaging the rod, and clutch mechanism connecting the roller and the valve, with means for preventing opening of the valve except when the rod moves in a predetermined direction, substantially as described.

In testimony whereof I have signed my name to this specification in the presence of two subscribing witnesses.

LOUIS A. B. JOHNSON.

Witnesses:
CHARLES C. NORRIS, Jr.,
WILLIAM E. BRADLEY.